US010771506B1

(12) United States Patent
Kumar et al.

(10) Patent No.: US 10,771,506 B1
(45) Date of Patent: Sep. 8, 2020

(54) DEPLOYMENT OF A SECURITY POLICY BASED ON NETWORK TOPOLOGY AND DEVICE CAPABILITY

(71) Applicant: Juniper Networks, Inc., Sunnyvale, CA (US)

(72) Inventors: Rakesh Kumar, San Ramon, CA (US); Srinivas Nimmagadda, San Jose, CA (US); Prakash T. Seshadri, Fremont, CA (US); Moloy K. Chatterjee, Milpitas, CA (US); Mihir S. Maniar, Sunnyvale, CA (US); Rakesh Manocha, Pleasanton, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 183 days.

(21) Appl. No.: 15/664,989

(22) Filed: Jul. 31, 2017

(51) Int. Cl.
*H04L 29/06* (2006.01)
*G06N 20/00* (2019.01)

(52) U.S. Cl.
CPC ............ *H04L 63/20* (2013.01); *G06N 20/00* (2019.01); *H04L 63/1433* (2013.01); *H04L 63/145* (2013.01)

(58) Field of Classification Search
CPC .... H04L 63/20; H04L 63/1433; H04L 63/145
USPC .......................................................... 726/1
See application file for complete search history.

(56) References Cited

U.S. PATENT DOCUMENTS

2017/0126727 A1* 5/2017 Beam ...................... H04L 63/20
2018/0191681 A1* 7/2018 Mihelich ............. H04L 63/0263
2018/0324219 A1* 11/2018 Xie ..................... H04L 63/0209

* cited by examiner

*Primary Examiner* — Brandon S Hoffman
*Assistant Examiner* — Nega Woldemariam
(74) *Attorney, Agent, or Firm* — Harrity & Harrity, LLP

(57) ABSTRACT

A device may include one or more processors to receive network topology information of a network and device capability information of devices in the network; detect a threat to the network; determine threat information associated with the threat; select a security policy and an enforcement device of the network to enforce the security policy based on the network topology information, the device capability information, and the threat information; and perform an action associated with the threat based on the security policy and the enforcement device.

20 Claims, 6 Drawing Sheets

DEPLOYMENT OF A SECURITY POLICY BASED ON NETWORK TOPOLOGY AND DEVICE CAPABILITY

BACKGROUND

Malware (i.e., malicious software) may refer to any software used to disrupt or threaten the operations of a computer or mobile device. This may include gathering sensitive information, gaining access to private computer systems, encrypting files, and/or displaying unwanted advertising. Malware may include viruses, worms, Trojan horses, adware, spyware, ransomware, keyboard loggers, phishing, and/or the like.

SUMMARY

According to some implementations, a device may include one or more processors to receive network topology information of a network and device capability information of devices in the network; detect a threat to the network; determine threat information associated with the threat; select a security policy and an enforcement device of the network to enforce the security policy based on the network topology information, the device capability information, and the threat information; and perform an action associated with the threat based on the security policy and the enforcement device.

According to some implementations, a non-transitory computer-readable medium storing instructions, the instructions comprising one or more instructions that, when executed by one or more processors, may cause the one or more processors to receive network topology information of a network and device capability information corresponding to capabilities of devices in the network; detect a threat to an affected device of the network; determine threat information associated with the threat; select a security policy to mitigate the threat based on the threat information; select an enforcement device in the network to enforce the security policy based on a location of the enforcement device indicated in the network topology information and an ability of the enforcement device to enforce the security policy indicated in the device capability information; and perform an action associated with the threat based on the security policy and the enforcement device.

According to some implementations, a method may include receiving, by one or more devices of a security platform, network topology information of a network and device capability information of devices in the network based on a change to a topology of the network or a change to a device capability of a device of the network; detecting, by at least one of the one or more devices, a threat to an affected device of the network; determining, by at least one of the one or more devices, threat information indicating a threat risk level or a threat presence level associated with the threat; selecting, by at least one of the one or more devices, a security policy and an enforcement device of the network to enforce the security policy based on the network topology information, the device capability information, and/or the threat information; and performing, by at least one of the one or more devices, an action associated with the threat based on the security policy and the enforcement device.

DETAILED DESCRIPTION

The following detailed description of example implementations refers to the accompanying drawings. The same reference numbers in different drawings may identify the same or similar elements.

As malware gets more sophisticated, security controls at the perimeter or edge of a network (e.g., an enterprise network, a branch network, or the like), may no longer be sufficient to mitigate threats from the malware. Enforcing threat policies (e.g., controls to mitigate threats) that leverage perimeter solutions (e.g., firewalls, intrusion prevention service (IPS), intrusion detection service (IDS), etc.) and network elements (e.g., switches, secure data network solutions, etc.) may secure the perimeter and prevent internal propagation of attacks. However, with different devices (e.g., from switches to routers to firewalls to software-defined networks (SDNs) to cloud platforms) having various capabilities and being deployed throughout a network, pushing a same security policy regardless of the type of device may not be beneficial from a performance and scale perspective. Furthermore, depending on a type of a threat to a network, it may or may not be beneficial for a device of a network to enforce a particular security policy to mitigate the threat to achieve greater performance of the network.

Some implementations, described herein, provide a security platform that deploys appropriate security policies to appropriate devices within a network to mitigate a threat. Selection of the appropriate security policies and the appropriate devices to enforce the security policies may be based on a topology of the network, capabilities of devices in the network, and threat information associated with the threat. Accordingly, some implementations herein may enable deployment of security policies to network devices without potentially overworking network devices with a number of security policies or rules to control a network that would negatively affect performance of the network devices, while at the same time, mitigating threats to the network. In this way, networks may remain secure while providing continued, expected performance by maintaining or improving reliability, timeliness, speed, or the like by avoiding overworking the network.

Figure 1A:
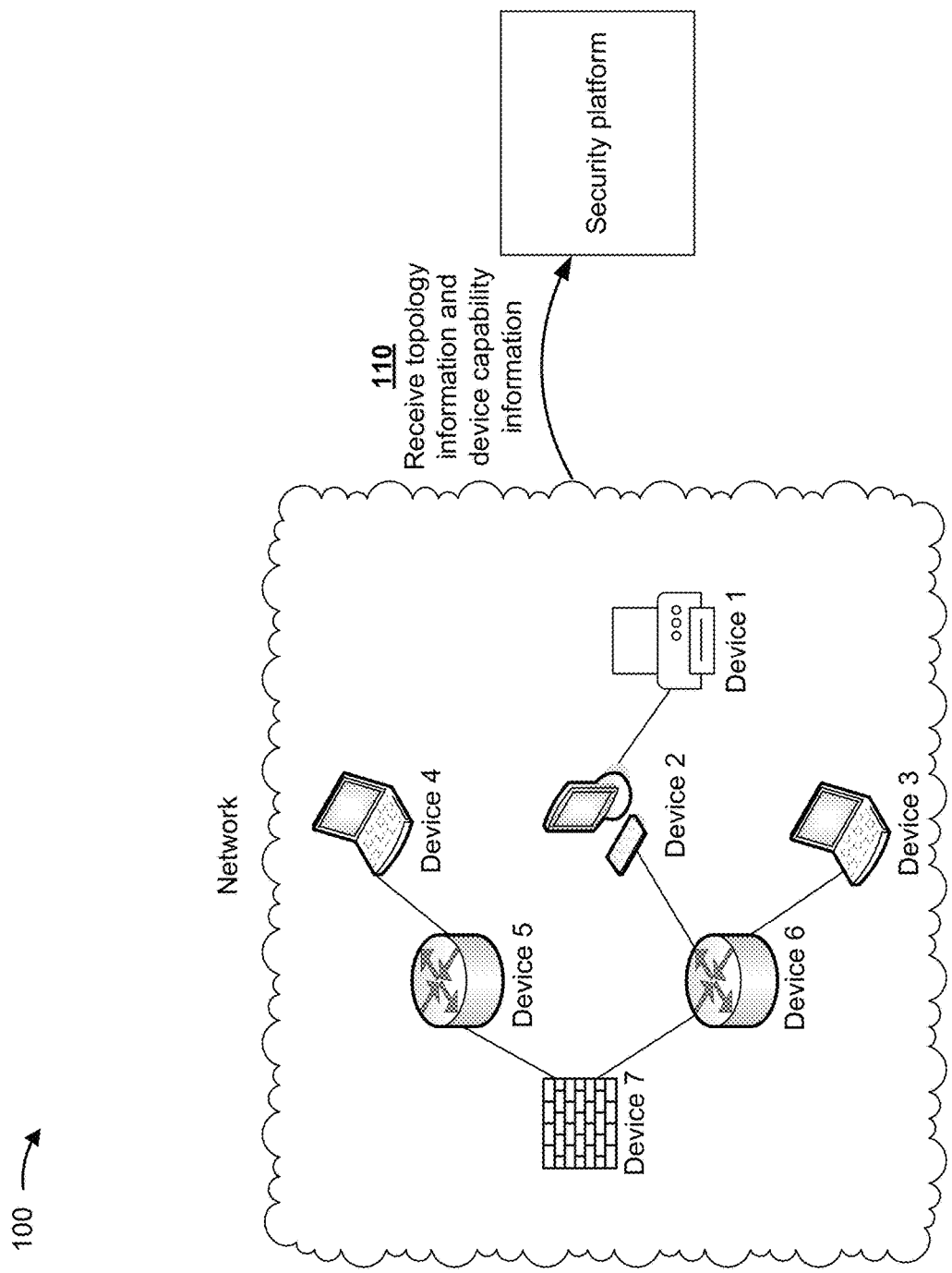
FIGS. 1A and 1B are diagrams of an overview of an example implementation described herein.
Figure 1B:
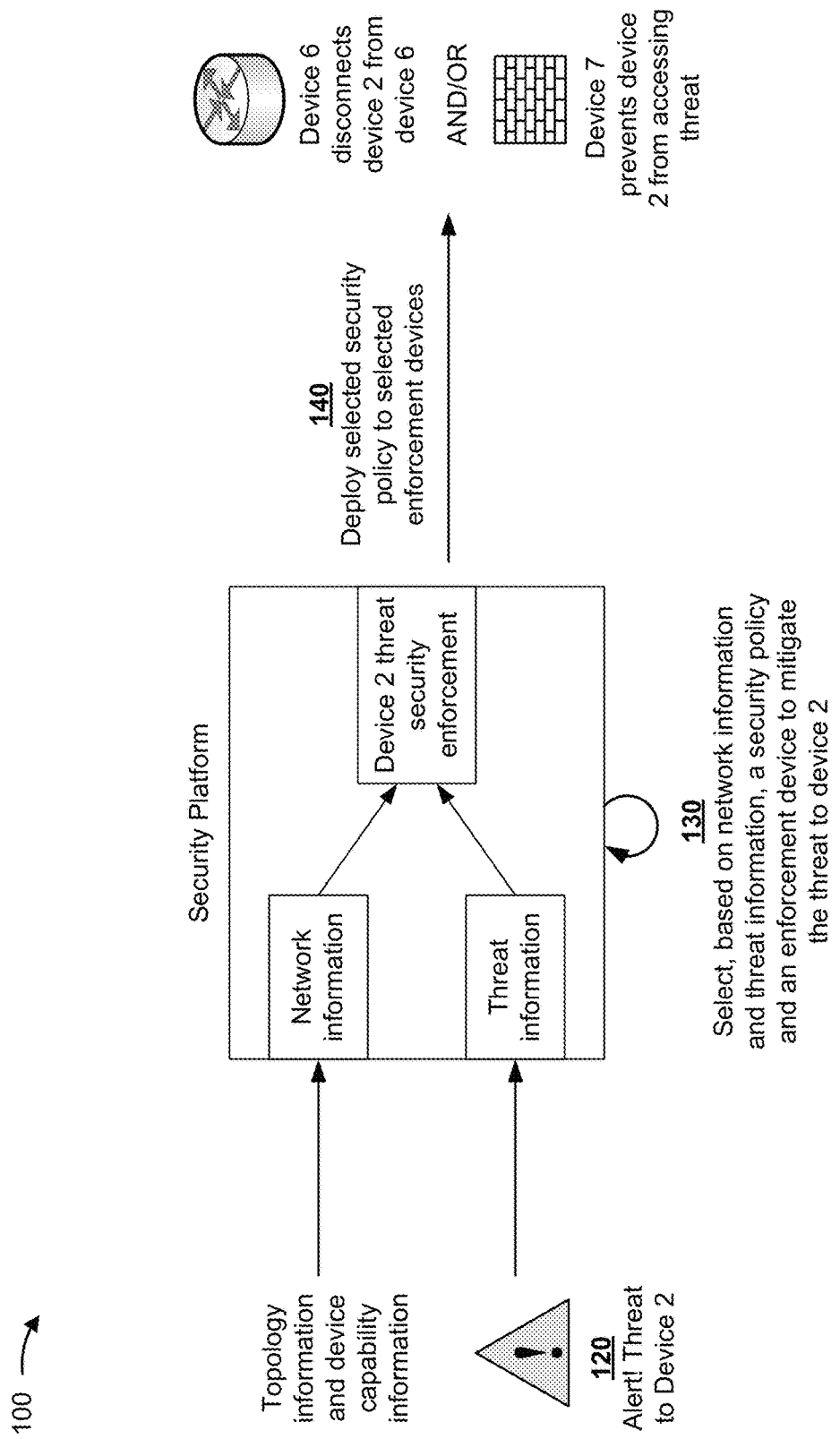

FIGS. 1A and 1B are diagrams of an overview of an example implementation 100 described herein. Generally, in FIGS. 1A and 1B, a security platform utilizes information from a network (e.g., including topology information and device capability information) to select a security policy and one or more enforcement device(s) of the network to mitigate a threat in the network.

As shown in FIG. 1A, and by reference number 110, the security platform receives network information including network topology information and device capability information from a network. The security platform may be tasked with monitoring the network of FIG. 1A for threats, including potential threats to particular devices in the network and/or threats present within the network. As shown in FIG.

1A, the example network includes devices 1-7, including a printer 1, client devices 2-4, switches 5 and 6, and firewall 7. Accordingly, the security platform may receive information corresponding to communication links between devices 1-7 (indicating the topology of the network) and the various capabilities of each of the devices 1-7. For example, firewall 7 may have different security control capabilities when compared with switches 5 and 6.

As shown in FIG. 1B, and by reference 120, the security platform receives an alert and/or detects a threat to the network (device 2, in particular). In some implementations, the security platform detects the threat. Additionally, or alternatively, the security platform may receive information associated with the threat. For example, the security platform may receive alerts of threats from one or more malware feeds. The threat of FIG. 1B may be a potential threat indicating the potential for malware to reach device 2 (or the network) or a threat indicating the threat is associated with malware on device 2 (e.g., malware is present on device 2).

As shown by reference number 130 of FIG. 1B, the security platform selects, based on network information of the network (e.g., the received network topology information and the device capability information) and threat information (indicating threat type, device affected (device 2), etc.), a security policy and an enforcement device to implement the security policy to mitigate the threat to device 2. For example, the security platform may determine the location of device 2 in the topology of the network, may analyze capabilities of other devices in the network around device 2 (e.g., connected to device 2 within the network), and may determine the type of threat, threat level, or other information associated with the threat to device 2 to select a security policy and an enforcement device to enforce the security policy to mitigate the threat. In some implementations, the security platform may utilize a scoring system and/or weighting system for the network information and/or the threat information to select the security policy and/or enforcement device.

As shown by reference number 140 in FIG. 1B, the security platform deploys the selected security policy (or security policies) to the selected enforcement device (or enforcement devices). For example, as shown, the security platform may deploy a security policy to device 6 to disconnect device 6 (a switch) from device 2 to effectively disconnect device 2 from the network (e.g., to prevent malware on device 2 from spreading to other devices in the network through device 6). Additionally, or alternatively, as shown, the security platform may deploy a security policy to device 7 (a firewall) that may prevent device 2 from accessing a threat (e.g., if the threat is external to the network, device 7 may block traffic to/from the threat).

Accordingly, the security platform may use network information (e.g., the topology information and/or the device capability information) to select a security policy and an enforcement device to enforce the security policy to mitigate a threat to a network. Using the network information, the security platform may place the security policy on a device that may be most capable of mitigating the threat at the nearest point of the threat. Accordingly, the example implementation 100 enables selective security policy deployment to appropriate enforcement devices within a network. As such, a network and/or devices of a network may not be overworked with unnecessary security policies while ensuring the security of the network, resulting in improved performance (e.g., reliability, speed, throughput, etc.) of the network and/or devices of the network.

As indicated above, FIGS. 1A and 1B are provided merely as an example. Other examples are possible and may differ from what was described with regard to FIGS. 1A and 1B.

Figure 2:
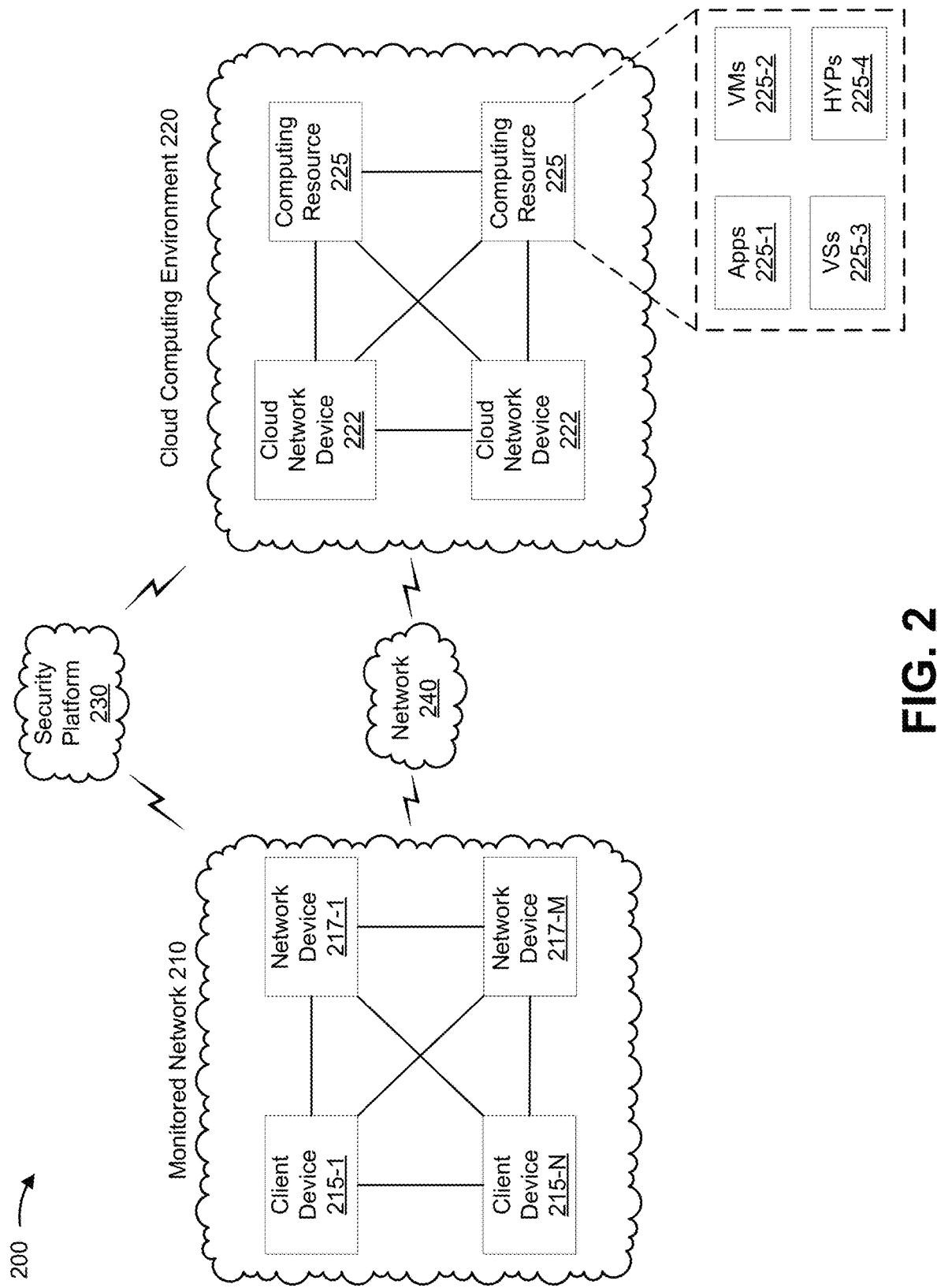
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a monitored network 210, one or more client devices 215-1 through 215-N (N≥1) (hereinafter referred to collectively as "client devices 215," and individually as "client device 215"), one or more network devices 217-1 through 217-M (M≥1) (hereinafter referred to collectively as "network devices 217," and individually as "network device 217"), a cloud computing environment 220, a cloud computing environment 220, one or more cloud network devices 222, one or more computing resources 225, and a network 240. Devices of environment 200 may interconnect via wired connections, wireless connections, or a combination of wired and wireless connections.

Monitored network 210 includes one or more wired and/or wireless networks. For example, monitored network 210 may include a local area network (LAN), a wide area network (WAN), a metropolitan area network (MAN), a private network, an ad hoc network, an intranet, the Internet, a fiber optic-based network, a cloud computing network, a branch network, an enterprise network, a data center, or the like, and/or a combination of these or other types of networks. Monitored network 210 may be monitored for threats by security platform 230 according to some implementations described herein.

Client device 215 includes one or more devices capable of receiving, generating, storing, processing, and/or providing information associated with the monitored network 210. For example, client device 215 may include a communication and/or computing device, such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), or a similar type of device.

Network device 217 includes one or more devices (e.g., one or more traffic transfer devices) capable of processing and/or transferring traffic between client devices 215 and/or cloud computing environment 220. For example, network device 217 may include a firewall, a router, a gateway, a switch, a hub, a bridge, a reverse proxy, a server (e.g., a proxy server), a security device, an intrusion detection device, a load balancer, or a similar device. In some implementations, network device 217 may be a physical device implemented within a housing, such as a chassis. In some implementations, network device 217 may be a virtual device implemented by one or more computer devices of a cloud computing environment or a data center.

Cloud computing environment 220 includes an environment that delivers computing as a service, whereby shared resources, services, etc. may be provided to the monitored network 210, including to client devices 215 and network devices 217. Cloud computing environment 220 may provide computation, software, data access, storage, and/or other services that do not require end-user knowledge of a physical location and configuration of a system and/or a device that delivers the services. As shown, cloud computing environment 220 may be monitored by security platform 230. In some implementations, cloud computing environment 220 may host security platform 230.

Cloud network device 222 includes one or more devices (e.g., one or more traffic transfer devices) capable of processing and/or transferring traffic to/from/between computing resources 225 within cloud computing environment 220.

For example, cloud network device 222 may include a firewall, a router, a gateway, a switch, a hub, a bridge, a reverse proxy, a server (e.g., a proxy server), a security device, an intrusion detection device, a load balancer, or a similar device. In some implementations, cloud network device 222 may be a physical device implemented within a housing, such as a chassis. In some implementations, cloud network device 222 may be a virtual device implemented by one or more computer devices of a cloud computing environment or a data center.

Computing resource 225 includes one or more personal computers, workstation computers, server devices, or another type of computation and/or communication device. In some implementations, computing resource 225 may host security platform 230. The cloud resources may include compute instances executing in computing resource 225, storage devices provided in computing resource 225, data transfer devices provided by computing resource 225, etc. In some implementations, computing resource 225 may communicate with other computing resources 225 via wired connections, wireless connections, or a combination of wired and wireless connections.

As further shown in FIG. 2, computing resource 225 may include a group of cloud resources, such as one or more applications ("APPs") 225-1, one or more virtual machines ("VMs") 225-2, virtualized storage ("VSs") 225-3, one or more hypervisors ("HYPs") 222-4, or the like.

Application 225-1 includes one or more software applications that may be used by security platform 230. For example, application 225-1 may include software associated with security platform 230 and/or any other software capable of being provided via cloud computing environment 220. In some implementations, one application 225-1 may send/receive information to/from one or more other applications 225-1, via virtual machine 225-2.

Virtual machine 225-2 includes a software implementation of a machine (e.g., a computer) that executes programs like a physical machine. Virtual machine 225-2 may be either a system virtual machine or a process virtual machine, depending upon use and degree of correspondence to any real machine by virtual machine 225-2. A system virtual machine may provide a complete system platform that supports execution of a complete operating system ("OS"). A process virtual machine may execute a single program, and may support a single process. In some implementations, virtual machine 225-2 may execute on behalf of security platform 230 and/or monitored network 210, and may manage infrastructure of cloud computing environment 220, such as data management, synchronization, or long-duration data transfers.

Virtualized storage 225-3 includes one or more storage systems and/or one or more devices that use virtualization techniques within the storage systems or devices of computing resource 225. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 225-4 provides hardware virtualization techniques that allow multiple operating systems (e.g., "guest operating systems") to execute concurrently on a host computer, such as computing resource 225. Hypervisor 225-4 may present a virtual operating platform to the guest operating systems, and may manage the execution of the guest operating systems. Multiple instances of a variety of operating systems may share virtualized hardware resources.

Security platform 230 may include a server device or a group of server devices. In some implementations, security platform 230 may be hosted in cloud computing environment 220. In some implementations, security platform 230 may be cloud-based (e.g., when hosted by cloud computing environment 220), may not be cloud-based, and/or may be partially cloud-based.

Security platform 230 includes one or more devices capable of detecting a threat to monitored network 210 and/or cloud computing environment 220 and/or providing security services over monitored network 210 and/or cloud computing environment 220. In some implementations, security platform 230 may determine threat information associated with the threat and select a security policy and/or an enforcement device to mitigate the threat. In some implementations, security platform 230 may include, may be included within, or may be implemented by a software defined secure network (SDSN). Additionally, or alternatively, security platform 230 may include, may be included within, or may be implemented by an IPS, an IDS, or the like.

Network 240 includes one or more wired and/or wireless networks. For example, network 240 may include a cellular network (e.g., a long-term evolution (LTE) network, a code division multiple access (CDMA) network, a 3G network, a 4G network, a 5G network, another type of next generation network, etc.), a public land mobile network (PLMN), a LAN, a WAN, a MAN, a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
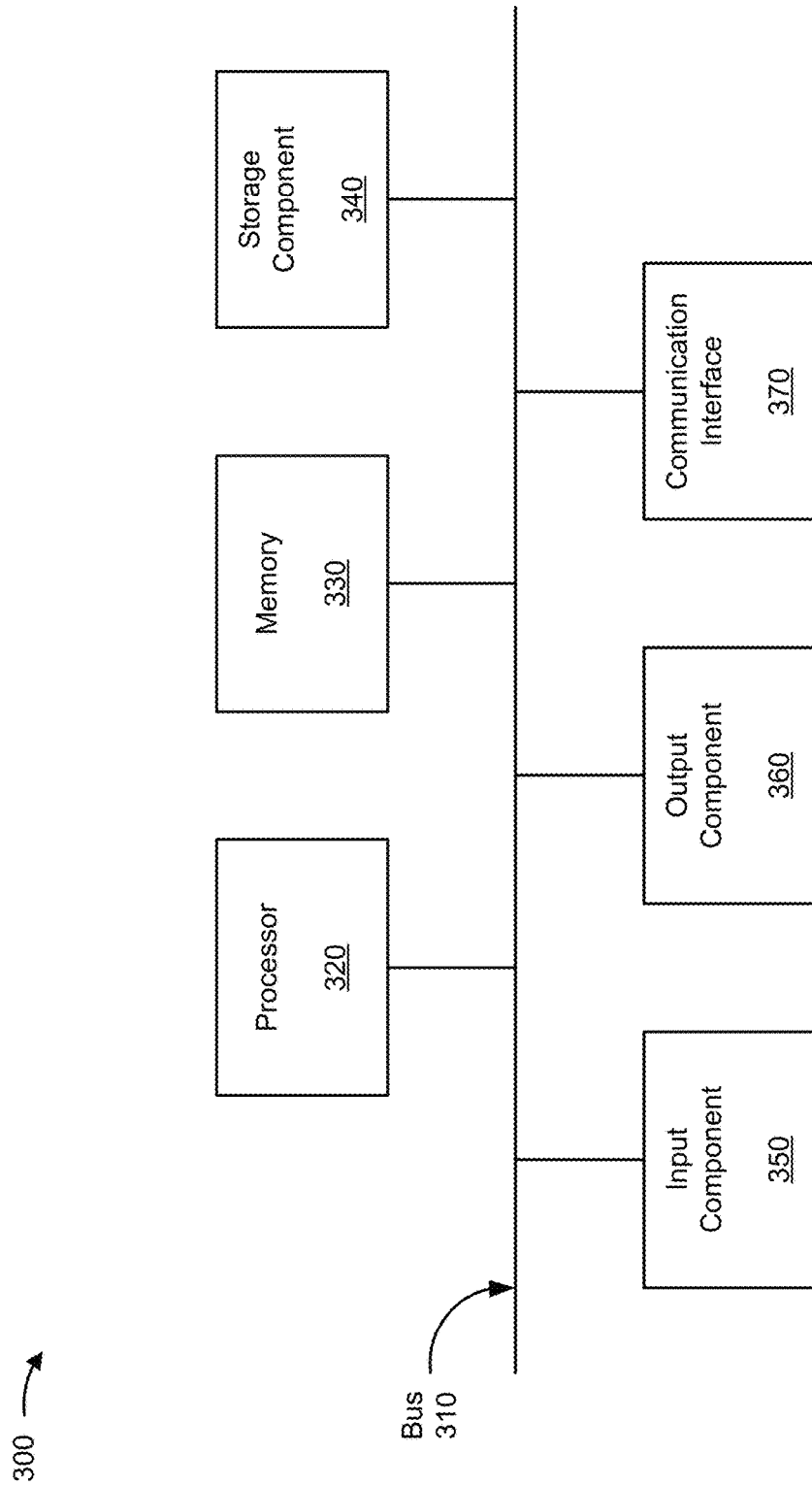
FIG. 3 is a diagram of example components of one or more devices of FIG. 2.

FIG. 3 is a diagram of example components of a device 300. Device 300 may correspond to client device 215, network device 217, cloud network device 222, computing resource 225, and/or one or more devices of security platform 230. In some implementations, client device 215, network device 217, security platform 230, and/or computing resource 225 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
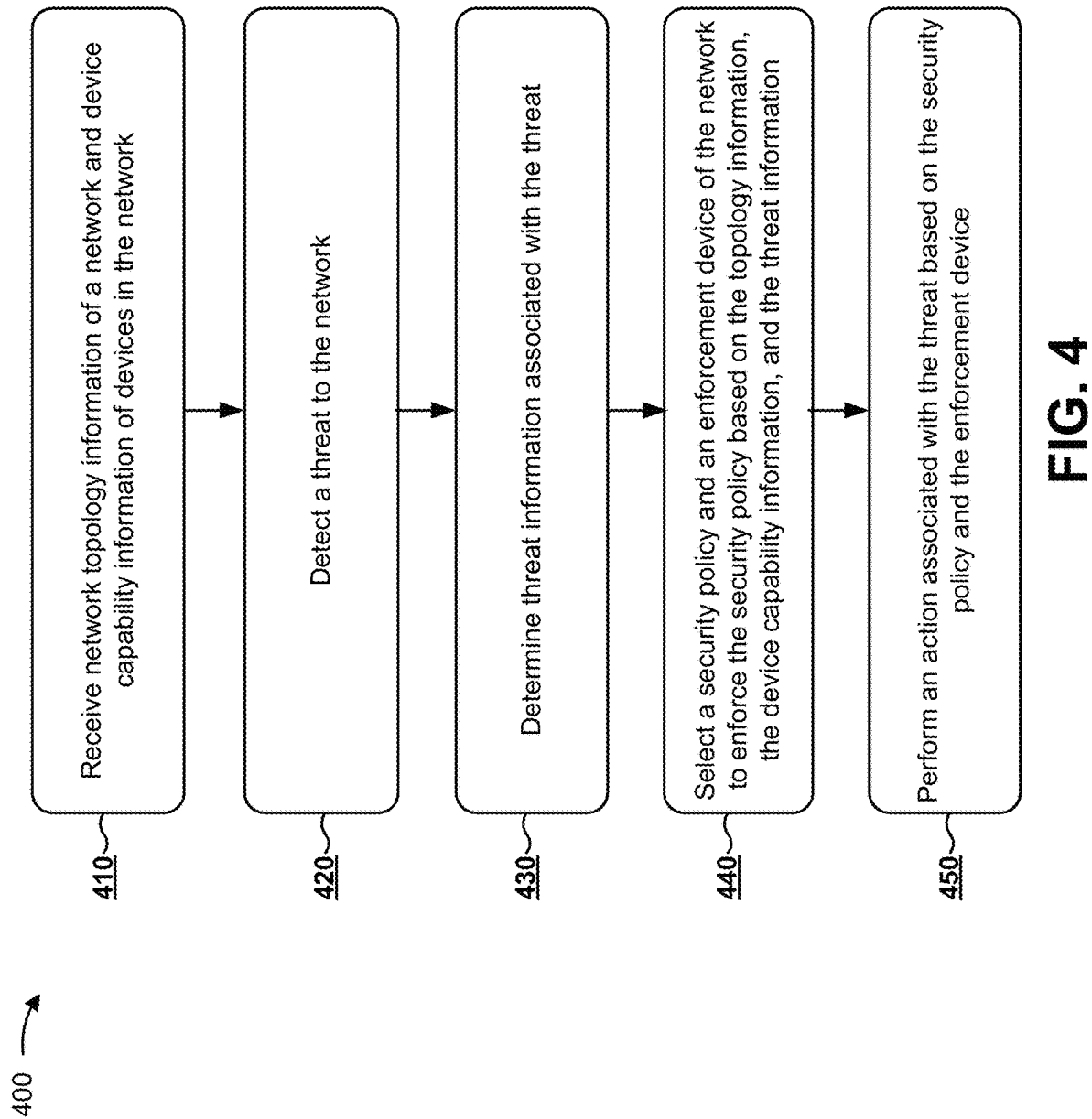
FIG. 4 is a flow chart of an example process for deploying a security policy based on a network topology and device capability.

FIG. 4 is a flow chart of an example process 400 for deploying a security policy based on a network topology and device capability. In some implementations, one or more process blocks of FIG. 4 may be performed by security platform 230. In some implementations, one or more process blocks of FIG. 4 may be performed by another device or a group of devices separate from or including security platform 230, such as client device 215, network device 217, and/or some other portion of cloud computing environment 220.

As shown in FIG. 4, process 400 may include receiving network topology information of a network and device capability information of devices in the network (block 410). For example, security platform 230 may receive the network topology information of monitored network 210 and the device capability information for client devices 215 and/or network devices 217 (which may be referred to herein, collectively, as devices 215, 217) and/or the network topology information of cloud computing environment 220 and the device capability information for cloud network device 222 and/or computing resource 225. In some implementations, security platform 230 may receive and/or determine the network topology information and/or the device capability information based on being placed in communication with monitored network 210, based on being powered-on, based on being activated or configured to provide security services for monitored network 210, based on receiving an instruction to provide security services for monitored network 210, or the like.

In some implementations, security platform 230 may receive the network topology information and/or the device capability information based on a change to a topology of monitored network 210 and/or cloud computing environment 220 and/or a change to device capabilities of devices of monitored network 210 and/or cloud computing environment 220. For example, if a device or communication link is added to, removed from, and/or modified in monitored network 210 or cloud computing environment 220, security platform 230 may receive updated topology information and/or device capability information. In some implementations, security platform 230 is capable of identifying the changes (e.g., by comparing previous network topology information and/or previous device capability information to updated network topology information and/or updated device capability information).

In some implementations, the network topology information and/or device capability information may include one or more sets of data, one or more files, one or more sets of text, one or more messages, one or more images, or the like including or representative of a network (e.g., monitored network 210) and the devices in the network. In some implementations, the content of the network topology information may include a number of devices 215, 217 in monitored network 210, communication link information indicating communication links between devices 215, 217 in monitored network 210 (e.g., indicating neighbor relationships between the devices 215, 217), location information of devices 215, 217 in monitored network 210 (e.g., physical location information, such as geographical information, site information, or rack/chassis location information, and/or logical information, such as the location within monitored network 210 relative to other devices of monitored network 210), port and/or socket information associated with communication links between devices 215, 217 in monitored network 210, or the like. The content of the device capability information for devices 215, 217 of monitored network 210 may include device type information of devices 215, 217 in monitored network 210 (e.g., a switch, a router, a gateway, an internal segmentation firewall, a perimeter firewall, an IPS, an IDS, etc.), functionality of devices 215, 217 in monitored network 210 (e.g., a list of the functions that devices 215, 217 are capable of performing), model information associated with devices 215, 217 (e.g., a model name, a model identifier, such as a serial number, or the like), communication protocols of devices 215, 217, bandwidth capabilities of devices 215, 217 (e.g., total bandwidth and/or available bandwidth), capacity of devices 215, 217, current security policies deployed to devices 215, 217, or the like.

In some implementations, security platform 230 may receive the network topology information and/or the device capability information from an element management system (EMS) of monitored network 210 that has access to the network topology information and/or the device capability information. In some implementations, security platform 230 may receive the network topology information and/or the device capability information using a network access control (NAC) or device inventory management system. For example, once security platform 230 is connected to monitored network 210, security platform 230 may implement the NAC protocol to receive the network topology information and/or the device capability information.

In this way, security platform 230 may receive network topology information and device capability information of devices 215, 217 in monitored network 210.

As further shown in FIG. 4, process 400 may include detecting a threat to the network (block 420). For example, security platform 230 may detect a threat to monitored network 210. In some implementations, security platform 230 may detect the threat based on being activated or configured to provide security services for monitored network 210. As used herein, a threat indicates a presence of malware in a network (e.g., the monitored network 210), the potential for malware to be in the network, or the potential for malware to reach the network.

In the examples to follow, a threat to monitored network 210 will be described in terms of a threat to client device 215 and/or network device 217. Accordingly, although threats may be referred to as affecting client device 215 of monitored network 210 in examples described herein, the threats may additionally, or alternatively, affect network device 217 in monitored network 210, cloud network device 222 and/or computing resource 225 of cloud computing environment 220, security platform 230, or the like.

In some implementations, security platform 230 may detect a threat by monitoring devices 215, 217 of monitored network 210 (e.g., by monitoring behavior of devices 215, 217, by monitoring communications between devices 215, 217, by monitoring performance of devices 215, 217 and/or monitored network 210, etc.). In some implementations, security platform 230 may receive threat notifications (e.g., an alert, a message, or the like indicating a potential threat or the presence of a threat or malware) from devices 215, 217 when devices 215, 217 detect a threat to monitored network 210.

In some implementations, security platform 230 may detect a threat to monitored network 210 and/or cloud computing environment 220 using one or more threat feeds from a threat detection system. For example, security platform 230 may receive threat notifications from a Command and Control (CnC) feed indicating a list of identified malicious entities, a Geographical Internet Protocol (Geo IP) feed indicating a list of locations and/or internet protocol (IP) addresses associated with locations (e.g., countries, regions, etc.) that may include malicious entities, a Malware feed indicating a list of identified malicious files (or hashes of files), an Infected Host feed indicating a list of entities (e.g., internal entities, such as client devices 215 of monitored network 210) that have been identified as infected with malware, a Distributed Denial of Service (DDoS) feed indicating a list of malicious entities (e.g., external entities) that may be attacking or attempting to attack a device 215, 217 of monitored network 210, or the like. A malicious entity may be a device that intends to spread malware. For example, a malicious entity may be a malicious client device, a malicious server, a malicious network device, a client device, server, or network device that has been taken over by the malicious entity, or the like.

In this way, security platform 230 may detect a threat to monitored network 210 to enable security platform 230 to determine threat information associated with the threat to mitigate the threat.

As further shown in FIG. 4, process 400 may include determining threat information associated with the threat (block 430). For example, security platform 230 may determine the threat information. In some implementations, security platform 230 may determine the threat information based on detecting the threat.

In some implementations, the content of the threat information may include a presence level of a threat (e.g., a likelihood that malware is present in monitored network 210, whether there is potential for malware to be present in monitored network 210, or whether there is potential for malware to reach monitored network 210, a severity of the presence of the threat, or the like), a risk level associated with the threat (e.g., information indicating a probability that malware is present in monitored network 210, information indicating a probability that malware may be present in the network, information indicating a probability that malware may reach monitored network 210, information indicating a severity of effects of malware, information indicating an amount of malware in monitored network 210, or the like), information indicating devices that may be affected by the threat, information indicating a source of the threat, information indicating how the threat propagates to other devices or how the threat behaves, information indicating which devices may eventually be affected if the threat is not mitigated, target information of the threat, or the like.

In some implementations, security platform 230 may assign one or more scores to the threat based on the threat information. For example, there may be a score based on a presence level of the threat, a score based on a risk level of the threat, a score based on location of the threat, or the like that may be combined, weighted, averaged, or the like to determine a score for the threat. The score for the threat may indicate a severity of the threat and a potential impact on monitored network 210, devices 215, 217, and/or an external network in communication with monitored network 210 (e.g., network 240). Security platform 230 may take measures to mitigate a threat if the score of the threat satisfies a threshold (e.g., a threshold that indicates the threat has a probability to cause a threshold amount of harm to monitored network 210).

In some implementations, security platform 230 may determine the threat information based on the threat feeds described above. For example, a CnC feed, a Geo IP feed, a malware feed, an infected host feed, and/or a DDoS feed may provide the threat information, corresponding to a particular threat to monitored network 210, to security platform 230. In some implementations, security platform 230 may receive and/or determine threat information from a database of threats or from other threat monitoring devices (e.g., from an IPS, from an IDS, or the like).

In this way, security platform 230 may determine threat information associated with a threat to select one or more security policies and/or one or more corresponding enforcement devices to mitigate the threat.

As further shown in FIG. 4, process 400 may include selecting a security policy and an enforcement device of the network to enforce the security policy based on the topology information, the device capability information, and the threat information (block 440). For example, security platform 230 may select the security policy and the enforcement device, such as network device 217, to enforce the security policy. In some implementations, security platform 230 may select the security policy and the enforcement device based on detecting the threat and/or determining the threat information.

As used herein, a security policy is a set of rules or instructions for one or more enforcement devices to enforce in order to mitigate a threat. For example, a security policy may provide instructions to quarantine a device (e.g., by disconnecting or rerouting communication links of the device), instructions to block traffic to/from a device (e.g., by filtering information to/from the device), instructions to shut down a device or operations of a device, instructions to scrub a device affected by a threat (e.g., by removing malware from the device), instructions to limit access from the device by a threat to mission critical services, or the like. In some implementations, security policies may be provided or suggested by the threat feeds described above, may be provided by another threat enforcement device, and/or may be selected from a list of security policies that may be deployed by security platform 230. As used herein, an enforcement device may be one or more devices (e.g., devices 215, 217) of a network (e.g., monitored network 210) capable of enforcing or implementing a security policy. For example, the enforcement device may be network device 217, such as a switch to quarantine an affected device and/or a firewall to prevent traffic to/from an affected client device 215 (e.g., via a traffic filter). Although example descriptions herein may refer to network device 217 as an enforcement device, in some implementations, an enforcement device may be a client device 215 that may scrub or remove malware from itself or another client device 215 using security removal software that may scrub or remove malware and/or that may block or prevent communications with an affected client device 215.

In some implementations, security platform 230 may select the security policy and/or the enforcement device based on which threat feed (e.g., which of the CnC feed, the Geo IP feed, the malware feed, the infected host feed, the DDoS feed, etc.) detected the threat and/or provided information on the threat. Security platform 230 may use the network topology information and the device capability information to select the enforcement device to enforce a selected security policy.

As an example, for threats detected in a CnC feed and/or a Geo IP feed, although placing a security policy at a switch (i.e., a network device 217) that is nearest to an affected client device 215 may appear to be desirable to mitigate the threat, the switch may have a limited amount of space in the switch's access control list (ACLs). With the increasing number of CnC sites and/or Geo IP addresses/locations identified in the feeds, the switch may quickly become overworked with too many CnC sites and/or Geo IP addresses/locations to track. Accordingly, security platform 230 may find a firewall (i.e., a network device 217) that is nearest an affected client device 215 in monitored network 210 to enforce the security policy because traffic to a CnC site and/or Geo IP address/location is routed to be received by the firewall, and the firewall can tolerate relatively large sets of rules and address entries when compared with a switch.

As another example, for a threat detected in a malware feed, malware files may originate from outside monitored network 210 (e.g., from network 240) or from an infected client device 215 spreading malware within monitored network 210. It may appear to be desirable to deploy a security policy to a firewall (i.e., a network device 217) at a perimeter or edge of monitored network 210, however, this security policy may not address internal threats. While deploying a security policy to a switch may appear to be desirable to address the internal threats, the switch may not have the ability to identify malware files from network 240 (e.g., due to the limited number of ACL space and/or inability to process malware hashes). Accordingly, in this example, security platform 230 may deploy a security policy to an internal segmentation firewall (i.e., a network device 217) to limit propagation of malware within monitored network 210 and/or to/from network 240.

As yet another example, for a threat detected in an infected host feed, because there may be fewer instances of attacks within monitored network 210 relative to potential attacks from outside monitored network 210 (e.g., via network 240), security platform 230 may deploy a security policy to a switch (i.e., a network device 217) that is nearest an affected client device 215. Accordingly, the ACLs of the switch may limit propagation to other client devices 215 in monitored network 210 and/or implement a quarantine of client device 215 by placing client device 215 on a separate network from monitored network 210 (e.g., a quarantine network). Additionally, or alternatively, security platform 230 may select a security policy to block traffic to/from client device 215 to be deployed to a firewall (i.e., a network device 217) at a perimeter of monitored network 210 (e.g., a perimeter firewall) to prevent client device 215 from infecting external entities via network 240.

As still another example, for a threat detected in a DDoS feed, which may be a threat that is triggered by external entities via network 240 and affects client devices 215 within monitored network 210, security platform 230 may select a security policy to block the attacks at a firewall (i.e., a network device 217) at a perimeter of monitored network 210 (e.g., a firewall closest to network 240).

In some implementations, security platform 230 may select the security policy and/or the enforcement device based on machine learning techniques. For example, security platform 230 (and/or another device in communication with security platform 230) may receive and/or store information associated with deployments of security policies to particular enforcement devices to mitigate particular threats. Accordingly, when detecting threats with similar characteristics (e.g., a same type, a same location in a network, a same risk level, etc.) to those that have been previously detected, machine learning techniques may be used to select a security policy and/or enforcement device based on success rates tracked for previous deployments of security policies to mitigate threats in networks with similar network topologies, device capabilities, and/or available enforcement devices.

In some implementations, security platform 230 may select particular security policies and/or enforcement devices using scores calculated or determined based on threat information of the detected threat, based on the network topology information, and/or based on the device capability information. In such implementations, security platform 230 may select a security policy and/or enforcement device based on the score of the security policies and/or enforcement devices. For example, security platform 230 may select a security policy that receives a score indicating a strongest possibility of mitigating the threat and/or an enforcement device that receives a score indicating a strongest possibility of mitigating the threat. Security platform 230 may scores to security policies and/or enforcement devices in any particular manner. For example, security policies may be assigned scores based on the threat information, and the enforcement devices may be assigned scores based on the security policy that received a highest score and the capability of the enforcement devices. As another example, the enforcement devices may be assigned scores based on the threat information, and the security policies may be assigned scores based on the capability of the enforcement device.

In some implementations, scores calculated for security policies and/or enforcement devices may be used to determine an optimal combination of a security policy and enforcement device for mitigating a threat according to security platform 230. For example, security platform 230 may be configured to consider a particular security policy and a particular enforcement device to enforce the security policy to be an optimal combination when the scores of the security policy and/or the enforcement device are greater than all or a threshold amount of scores of other possible combinations of security policies and enforcement devices, when the scores satisfy a threshold probability of mitigating the threat, when a combined score (e.g., a combination of the scores) of the security policy and/or the enforcement device is greater than all or a threshold amount of combined scores of other possible combinations of security policies and enforcement devices, and/or when a combined score (e.g., a combination of the scores) satisfies a threshold probability of mitigating the threat.

The following is an example implementation of a selection process that security platform 230 may perform based on detecting a threat. For example, when a threat is detected, security platform 230 may first analyze threat information to determine whether the threat is to be mitigated (e.g., this determination may be based on a risk level of the threat, a presence level of the threat, etc.). If the threat is not to be mitigated, security platform 230 may continue providing security service for monitored network 210. If the threat is to be mitigated, security platform 230 may analyze the threat information to identify which device 215, 217 in monitored network 210 may be affected by the threat (e.g., devices 215, 217 that are infected with malware and/or devices 215, 217 that may be targets of malware). Using the network topology information, security platform 230 may determine which network devices 217 are toward or near the affected device 215, 217 using the topology of monitored network 210 so that those network devices 217 may be selected serve as enforcement devices. For example, security platform 230 may identify network devices 217 that are closest to the affected device 215, 217 using the topology of the monitored network 210 and that have not been affected by the threat to serve as enforcement devices. Based on the device capabilities (e.g., device type, device bandwidth, device processing power, device functionality, etc.) of the network devices 217 and the threat information (e.g., type of threat, where the threat is coming from, type of feed associated with the threat, etc.), security platform 230 may first select one or more of the network devices 217 as an enforcement device and then a security policy that the enforcement device is capable of enforcing or may first select a security policy and then select one of the network devices 217 as the enforcement device to enforce the security policy. In some implementations, security platform 230 may score combinations of security policies and enforcement devices to mitigate the threat. The example scores may reflect compatibility between the security policies and the enforcement devices (i.e., whether an enforcement device has the ability to effectively enforce the security policy) as well as a probability of success that the threat is mitigated.

In this way, security platform 230 may select a security policy and an enforcement device to enforce the security policy to enable security platform 230 to perform an action associated with the threat using the selected security policy and enforcement device.

As further shown in FIG. 4, process 400 may include performing an action associated with the threat based on the security policy and the enforcement device (block 450). For example, security platform 230 may perform the action. In some implementations, security platform 230 may perform the action based on the selection of the security policy and/or the selection of the enforcement device.

In some implementations, when performing the action, security platform 230 may deploy the selected security policy to the enforcement device. Accordingly, the deployed security policy being enforced on the enforcement device may mitigate the detected threat and prevent the spread of malware and/or further spreading of malware. Accordingly, such a deployment may prevent device or network failures, shutdowns, inoperability, security breaches, loss of files or information (e.g., personal or financial information), theft, or the like. Therefore, some implementations herein may ensure the health of a device or network by detecting a threat and/or preventing a malware attack associated with the threat, thus, conserving resources, time, and costs of handling an attacked device or network and/or recovering the device or network from the potential malware attack. Furthermore, some implementations herein enable tracking of devices (e.g., devices affected by a threat, infected devices, etc.) of a network when there is a change to the network. For example, if an infected device is moved in a network (e.g., resulting in a change in the network topology), or other devices are added, modified, or removed from the network (e.g., resulting in a change to device capability information), security policies and/or enforcement devices may be updated to account for the change by deploying one or more new security policies to one or more corresponding enforcement devices.

In some implementations, when performing the action, security platform 230 may store or provide selection information associated with the selection of the security policy and/or the selection of the enforcement device. For example, security platform 230 may generate selection information corresponding to a success of the deployment of the security policy to the enforcement device (e.g., a report that indicates whether the threat was mitigated using the selected security policy and/or enforcement device). The example selection information may then be used or analyzed for machine learning purposes to enable security platform 230 to make selections of security policies and/or enforcement devices for future attacks based on the stored information.

In some implementations, when performing an action, security platform 230 may provide or transmit information associated with the threat. For example, security platform 230 may provide information to cause a user interface to present results of a deployment of a selected security policy to a selected enforcement device to mitigate a detected threat. Example results of the deployment may include a malware report or alert (e.g., notifying a user of the presence or non-presence of malware) and/or threat information associated with the detected threat, such as threat type, affected or targeted devices, sources or origins of the threat, or the like. In some implementations, security platform 230 may provide information to an intended target of a threat (e.g., a warning to avoid a particular CnC site, infected host, communication with a flagged Geo IP address, etc.). In some implementations, security platform 230 may provide information to a system associated with preventing threats (e.g., a system that communicates with security platform 230 or a group of security platforms 230).

In this way, security platform 230 may perform an action associated with the threat based on the security policy and enforcement device that were selected. Such actions may prevent threats from harming devices 215, 217 and/or monitored network 210. Accordingly, such actions may enable devices 215, 217 and/or monitored network 210 to remain operable, prevent failures or shutdowns of the devices 215, 217 and/or monitored network 210, or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
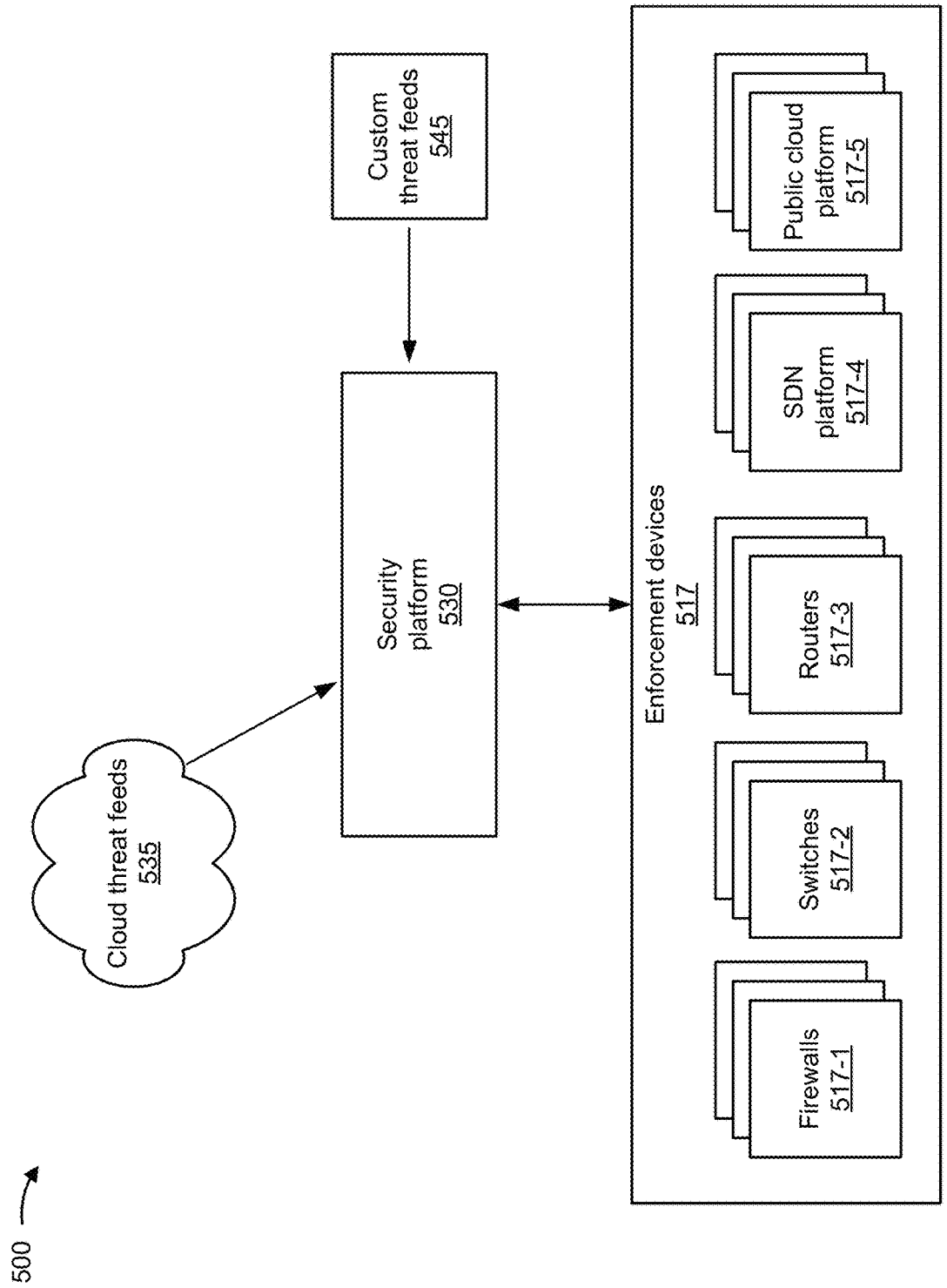
FIG. 5 is an example implementation relating to the example process shown in FIG. 4.

FIG. 5 is diagram of an example implementation 500 relating to example process 400 shown in FIG. 4. FIG. 5 shows an example of a threat detection architecture that may utilize network topology information and device capability information in accordance with some implementations described herein. The example implementation 500 includes enforcement devices 517 (including firewalls 517-1, switches 517-2, routers 517-3, SDN platforms 517-4, and public cloud platforms 517-5), security platform 525, cloud threat feeds 535 and custom threat feeds 545. In the example implementation 500, security platform 525 may utilize detected threats and/or threat information from cloud threat feeds 535 and/or custom threat feeds 545 to select security policies to deploy to enforcement devices 517.

As shown in FIG. 5, security platform 525 may detect a threat using cloud threat feeds 535 and/or custom threat feeds 545. Cloud threat feeds 535 may be threat feeds that are available to networks in communication with a cloud computing environment (e.g., cloud computing environment 220). Custom threat feeds 545 may be threat feeds that are specific to a particular monitored network (e.g., when particular threats are known to be present in a monitored network 210, when particular devices of a monitored network 210 are known to be infected, or the like). Accordingly, security platform 230 may use cloud threat feeds 535 and custom threat feeds 545 to detect threats and receive threat information.

Using the threats and threat information from cloud threat feeds 535 and custom threat feeds 545, security platform 525 may deploy security policies to enforcement devices 517. According to some implementations herein, security platform 525 may deploy the security policies to enforce the security policies based on the types of threats and capabilities of the enforcement devices 517 (which may include the location of the enforcement devices 517 within a topology of a network, the location of the enforcement devices 517 relative to a location of a threat, or the like).

As indicated above, FIG. 5 is provided merely as an example. Other examples are possible and may differ from what was described with regard to FIG. 5.

Accordingly, some implementations herein allow for deployment of security policies to enforcement devices based on network topology information of a network and capabilities of devices of the network. As such, some implementations herein enable securing a threat without overworking network devices of the network with multiple security policies. For example, some implementations, rather than deploying a security policy to all possible enforcement devices of a network, may select one or more enforcement devices that are capable of securing the threat without overworking the remaining enforcement devices with an unnecessary security policy. Accordingly, devices of the network, and the network itself, may avoid shutdowns, failures, inoperability, traffic loss, or the like due to overworked enforcement devices.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

Some implementations are described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, etc.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
   a communication interface; and
   one or more processors to:
      receive network topology information of a network and device capability information of devices in the network;
      detect a threat to the network using a threat feed from a threat detection system,
         the threat feed being included in a plurality of threat feeds used by the device, and
         the plurality of threat feeds including:
            a Command and Control (CnC) feed indicating a list of identified malicious entities or a Geographical Internet Protocol (Geo IP) feed indicating a list of at least one of locations or internet protocol (IP) addresses associated with locations that include malicious entities,
            an Infected Host Feed indicating a list of entities that have been identified as infected with malware, and
            a Malware feed indicating a list of identified malicious files;
      determine threat information associated with the threat based on the threat feed used to detect the threat;
      select a security policy and an enforcement device of the network to enforce the security policy based on the network topology information, the device capability information, and the threat information,
         the enforcement device being selected from a switch nearest an affected client device, a firewall nearest the affected client device, a firewall at a perimeter of the network, and an internal segmentation firewall,
            the firewall nearest the affected client device being selected as the enforcement device, and not the switch nearest the affected client device, to enforce a first security policy when the threat feed used to detect the threat is the CnC feed or the Geo IP feed,
            the switch nearest the affected client device and the firewall at the perimeter of the network being selected as the enforcement device to enforce a second security policy when the threat feed used to detect the threat is the Infected Host Feed, and
            the internal segmentation firewall being selected as the enforcement device, and not the firewall at the perimeter of the network nor the switch nearest the affected client device, to enforce a third security policy when the threat feed used to detect the threat is the Malware feed; and
      perform an action associated with the threat based on the security policy and the enforcement device.

2. The device of claim 1, where the one or more processors, when detecting the threat to the network, are to:
   detect the threat based on a particular threat feed, of the plurality of threat feeds, providing a notification of the threat; and
   where the one or more processors, when selecting the security policy and the enforcement device, are to:
      select the security policy and the enforcement device based on the particular threat feed.

3. The device of claim 1, where the one or more processors, when determining the threat information associated with the threat, are to:
   receive the threat information from the threat feed.

4. The device of claim 1, where the one or more processors, when selecting the security policy and the enforcement device, are further to:
   determine a location of the enforcement device in a topology of the network;
   select the enforcement device based on the location of the enforcement device; and
   select the security policy based on the selected enforcement device and the threat information.

5. The device of claim 1, where the one or more processors, when selecting the security policy and the enforcement device, are to:
   determine a threat type of the threat from the threat information;
   select the security policy based on the threat type;
   determine that the enforcement device is capable of enforcing the security policy; and
   select the enforcement device to enforce the security policy based on the enforcement device being capable of enforcing the security policy.

6. The device of claim 1, where the one or more processors, when performing the action, are to:
   deploy the first security policy to the firewall nearest the affected client device to mitigate the threat.

7. The device of claim 1, where the one or more processors, when performing the action, are to:
   provide information associated with the selection of the security policy, the selection of the enforcement device, and whether the threat was mitigated.

8. A non-transitory computer-readable medium storing instructions, the instructions comprising:
   one or more instructions that, when executed by one or more processors of a device, cause the one or more processors to:
      receive network topology information of a network and device capability information corresponding to capabilities of devices in the network;

detect a threat to an affected client device of the
network using a threat feed from a threat detection
system,
the threat feed being included in a plurality of threat
feeds used by the device, and
the plurality of threat feeds including:
a Command and Control (CnC) feed indicating a
list of identified malicious entities or a Geographical Internet Protocol (Geo IP) feed indicating a list of at least one of locations or
internet protocol (IP) addresses associated with
locations that include malicious entities,
an Infected Host Feed indicating a list of entities
that have been identified as infected with malware, and
a Malware feed indicating a list of identified
malicious files;
determine threat information associated with the threat
based on the threat feed used to detect the threat;
select a security policy to mitigate the threat based on
the threat information;
select an enforcement device in the network to enforce
the security policy based on a location of the
enforcement device indicated in the network topology information and an ability of the enforcement
device to enforce the security policy indicated in the
device capability information,
the enforcement device being selected from a switch
nearest the affected client device, a firewall nearest the affected client device, a firewall at a
perimeter of the network, and an internal segmentation firewall,
the firewall nearest the affected client device being
selected as the enforcement device, and not the
switch nearest the affected client device, to
enforce a first security policy when the threat
feed used to detect the threat is the CnC feed or
the Geo IP feed,
the switch nearest the affected client device and
the firewall at the perimeter of the network
being selected as the enforcement device to
enforce a second security policy when the threat
feed used to detect the threat is the Infected
Host Feed, and
the internal segmentation firewall being selected
as the enforcement device, and not the firewall
at the perimeter of the network nor the switch
nearest the affected client device, to enforce a
third security policy when the threat feed used
to detect the threat is the Malware feed; and
perform an action associated with the threat based on
the security policy and the enforcement device.

9. The non-transitory computer-readable medium of claim
8, where the one or more instructions, when executed by the
one or more processors, further cause the one or more
processors to:
determine that the enforcement device has the ability to
enforce the security policy based on a type of the
enforcement device indicated in the device capability
information.

10. The non-transitory computer-readable medium of
claim 8, where the one or more instructions, when executed
by the one or more processors, further cause the one or more
processors to:
determine the location of the enforcement device relative
to the affected client device in a topology of the
network based on the network topology information.

11. The non-transitory computer-readable medium of
claim 8,
where the plurality of threat feeds include a Distributed
Denial of Service (DDoS) feed indicating a list of
malicious entities that are attacking or attempting to
attack the network,
where the one or more instructions, that cause the one or
more processors to select the enforcement device,
cause the one or more processors to:
select the enforcement device as a firewall at a perimeter
of the network based on the ability of the firewall
indicated in the device capability information and
based on the DDoS feed being used to detect the threat.

12. The non-transitory computer-readable medium of
claim 8, where the one or more instructions, that cause the
one or more processors to select the security policy, cause
the one or more processors to:
use machine learning to select the security policy based
on the threat information.

13. The non-transitory computer-readable medium of
claim 8, where the one or more instructions, that cause the
one or more processors to select the enforcement device,
cause the one or more processors to:
use machine learning to select the enforcement device
based on the network topology information, the device
capability information, the threat information, and/or
information regarding the security policy.

14. The non-transitory computer-readable medium of
claim 8, where the one or more instructions, that cause the
one or more processors to perform the action, cause the one
or more processors to:
deploy the first security policy to the firewall nearest the
affected client device to mitigate the threat.

15. A method, comprising:
receiving, by one or more devices of a security platform,
network topology information of a network and device
capability information of devices in the network based
on a change to a topology of the network or a change
to a device capability of a device of the network;
detecting, by at least one of the one or more devices, a
threat to an affected client device of the network, using
a threat feed from a threat detection system,
the threat feed being included in a plurality of threat
feeds used by the one or more devices, and
the plurality of threat feeds including:
a Command and Control (CnC) feed indicating a list
of identified malicious entities or a Geographical
Internet Protocol (Geo IP) feed indicating a list of
at least one of locations or internet protocol (IP)
addresses associated with locations that include
malicious entities,
an Infected Host Feed indicating a list of entities that
have been identified as infected with malware, and
a Malware feed indicating a list of identified malicious files;
determining, by at least one of the one or more devices,
threat information indicating a threat risk level or a
threat presence level associated with the threat based on
the threat feed used to detect the threat;
selecting, by at least one of the one or more devices, a
security policy and an enforcement device of the network to enforce the security policy based on the
network topology information, the device capability
information, and/or the threat information,
the enforcement device being selected from a switch
nearest the affected client device, a firewall nearest the affected client device, a firewall at a perimeter of the network, and an internal segmentation firewall, the firewall nearest the affected client device being selected as the enforcement device, and not the switch nearest the affected client device, to enforce a first security policy when the threat feed used to detect the threat is the CnC feed or the Geo IP feed, the switch nearest the affected client device and the firewall at the perimeter of the network being selected as the enforcement device to enforce a second security policy when the threat feed used to detect the threat is the Infected Host Feed, and the internal segmentation firewall being selected as the enforcement device, and not the firewall at the perimeter of the network nor the switch nearest the affected client device, to enforce a third security policy when the threat feed used to detect the threat is the Malware feed; and performing, by at least one of the one or more devices, an action associated with the threat based on the security policy and the enforcement device.

16. The method of claim 15, further comprising:

detecting that the threat is associated with a malicious entity external to the network; and selecting a device at a perimeter of the network to be the enforcement device to enforce the security policy based on the threat being associated with the malicious entity, the security policy to block traffic between the network and the malicious entity.

17. The method of claim 15, where selecting the security policy and the enforcement device comprises:

determining a location of the enforcement device in a topology of the network relative to the affected client device;

selecting the enforcement device based on the location of the enforcement device; and selecting the security policy based on the selected enforcement device and the threat risk level or the threat presence level.

18. The method of claim 15, where selecting the security policy and the enforcement device comprises:

selecting the security policy based on the threat risk level or the threat presence level;

determining that the enforcement device is capable of enforcing the security policy; and selecting the enforcement device to enforce the security policy based on the enforcement device being capable of enforcing the security policy.

19. The method of claim 15, where performing the action comprises:

deploying the first security policy to the firewall nearest the affected client device.

20. The method of claim 15, further comprising:

assigning one or more scores to the threat based on the threat risk level; and mitigating the threat if the one or more scores satisfies a threshold.

* * * * *